United States Patent
Seong et al.

(10) Patent No.: US 9,570,731 B2
(45) Date of Patent: Feb. 14, 2017

(54) RECHARGEABLE BATTERY HAVING INSULATION CASE

(71) Applicant: SAMSUNG SDI CO., LTD., Yongin-si, Gyeonggi-do (KR)

(72) Inventors: Jae-Il Seong, Yongin-si (KR); Hideaki Yoshio, Yongin-si (KR); Ji-Won Yun, Yongin-si (KR); Kwang-Sik Seo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 282 days.

(21) Appl. No.: 14/279,259

(22) Filed: May 15, 2014

(65) Prior Publication Data

US 2015/0171407 A1    Jun. 18, 2015

(30) Foreign Application Priority Data

Dec. 16, 2013  (KR) .................. 10-2013-0156603

(51) Int. Cl.
| | | |
|---|---|---|
| *H01M 2/30* | (2006.01) | |
| *H01M 2/06* | (2006.01) | |
| *H01M 2/22* | (2006.01) | |
| *H01M 2/34* | (2006.01) | |
| *H01M 2/02* | (2006.01) | |
| *H01M 2/04* | (2006.01) | |

(52) U.S. Cl.
CPC .............. *H01M 2/30* (2013.01); *H01M 2/06* (2013.01); *H01M 2/22* (2013.01); *H01M 2/347* (2013.01); *H01M 2/0217* (2013.01); *H01M 2/0473* (2013.01); *H01M 2200/00* (2013.01)

(58) Field of Classification Search
None
See application file for complete search history.

(56) References Cited

U.S. PATENT DOCUMENTS

2006/0051667 A1*  3/2006  Kim .................. H01M 2/22
                                                           429/184
2014/0154544 A1*  6/2014  Iwasaki ............ H01M 2/0426
                                                            429/94

FOREIGN PATENT DOCUMENTS

| EP | 2 144 312 A1 | 1/2010 |
|---|---|---|
| EP | 2 672 542 A2 | 12/2013 |
| JP | 5113959 | 10/2012 |
| KR | 10-2006-0011315 | 2/2006 |
| WO | WO 2013/031056 A1 | 3/2013 |

OTHER PUBLICATIONS

EPO Search Report dated Feb. 16, 2015, for corresponding European Patent application 14189551.6, (8 pages).

* cited by examiner

*Primary Examiner* — Patrick Ryan
*Assistant Examiner* — Christopher Domone
(74) *Attorney, Agent, or Firm* — Lewis Roca Rothgerber Christie LLP

(57) ABSTRACT

A rechargeable battery includes an electrode assembly including a first electrode, a second electrode, and a separator located between the first electrode and the second electrode; a case accommodating the electrode assembly; a cap plate sealing an opening of the case; and an insulation case located between the cap plate and the electrode assembly, the insulation case having a base and a side wall protruding from the base, the side wall including avoiding portions formed thereon.

16 Claims, 13 Drawing Sheets

101

RECHARGEABLE BATTERY HAVING INSULATION CASE

CROSS-REFERENCE TO RELATED APPLICATION

This application claims priority to and the benefit of Korean Patent Application No. 10-2013-0156603 filed in the Korean Intellectual Property Office on Dec. 16, 2013, the entire contents of which are incorporated herein by reference.

BACKGROUND

1. Field

The described technology relates generally to a rechargeable battery pack.

2. Description of the Related Art

A rechargeable battery differs from a primary battery in that a rechargeable battery can be repeatedly charged and discharged, while the latter only irreversibly converts chemical energy to electrical energy. A low-capacity rechargeable battery is typically used as the power supply for small electronic devices, such as cellular phones, notebook computers and camcorders, while the high-capacity rechargeable battery is typically used as the power supply for driving motors in hybrid vehicles and the like.

Types of rechargeable batteries include a nickel-cadmium battery, a lead-acid battery, a nickel-hydride battery, a lithium ion battery, and a lithium polymer battery. In particular, an operation voltage of the lithium ion secondary battery is three times higher than that of the nickel-cadmium battery used as a portable electronic equipment of the nickel hydride battery. In addition, the lithium ion secondary battery has been widely used because of high energy density per unit weight.

Some rechargeable batteries use a lithium-based oxide as a positive electrode active material and a carbon-based material as a negative electrode active material. In general, a rechargeable battery is classified as a liquid electrolyte battery or a polymer electrolyte battery according to the type of electrolyte, and a battery using the liquid electrolyte is called a lithium ion battery and a battery using the polymer electrolyte is called a lithium polymer battery.

When an impact is applied in a longitudinal direction to rechargeable batteries, the rechargeable batteries may become deformed, thereby being maintained in a dangerous state. When the rechargeable batteries are deformed, an internal short-circuit may occur. When the internal short-circuit occurs in a portion having high resistance, excessive heat may be generated in the rechargeable battery.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery having improved safety with respect to longitudinal compression.

A rechargeable battery according to one aspect of the present invention includes: an electrode assembly including a first electrode, a second electrode, and a separator provided between the first electrode and the second electrode; a receiving case having a space where the electrode assembly is received; a cap plate coupled to an opening formed in the case; and an insulation case provided between the cap plate and the electrode assembly and an insulation case having a base and a side wall protruding from the base. Avoiding portions are formed in the side wall.

A first tab may be provided in the first electrode, a second tab is provided in the second electrode, and a connection plate connected to the second tab and rotatable with respect to the cap plate may be provided in the cap plate.

The avoiding portions have a structure concave toward a lower portion from an upper end of the side wall, the avoiding portions may be lower than other portions, and the avoiding portions may be formed in the shape of openings formed penetrating the side wall.

The avoiding portion may be provided between a side end of the connection plate and a side surface of the receiving case, and the connection plate may be fixed to the cap plate using a terminal that penetrates the cap plate and the connection plate.

An insulation plate having an electrically insulating property may be provided between the cap plate and the connection plate, and short-circuit step protruding to a width direction of the connection plate may be formed in a lateral side ends of the connection plate.

The avoiding portion is provided between the short-circuit step and the side surfaces of the receiving case, and the connection plate may include a first portion to which the first tab is attached and a second portion through which the terminal penetrates, and the second portion has a wider width than the first portion.

A short-circuit step protruding to the outside from a side end of the first portion may be formed in a portion where the first portion and the second portion are connected, and the avoiding portion may be provided between the second portion and the side surface of the receiving case.

Two avoiding portions separated from each other may be disposed facing each other along a width direction of the insulation case, and short-circuit protrusions protruding to a length direction of the connection plate may be formed at a front end of the second portion.

Two short-circuit protrusions separated from each other may be formed at the front end of the second portion, an alignment protrusion protruding toward the cap plate may be formed in the cap plate, and the alignment may be provided between the short-circuit protrusions.

A cut-out portion extended in a length direction of the short-circuit protrusion may be formed in a portion where the short-circuit protrusions and the second portion are connected, and a groove may be formed between the short-circuit protrusions, and the groove is concave toward an inner side from the front end of the second portion.

If the receiving case is bent due to a compression force, one of the two short-circuit protrusions may contact a side surface of the receiving case and the other short-circuit may contacts the alignment protrusion.

According to the exemplary embodiment, when the rechargeable battery is deformed by a longitudinal compression force, the connection plate and the case contact each other, thereby causing a short-circuit so that an internal current of the rechargeable battery can be emitted.

DETAILED DESCRIPTION

Figure 1:
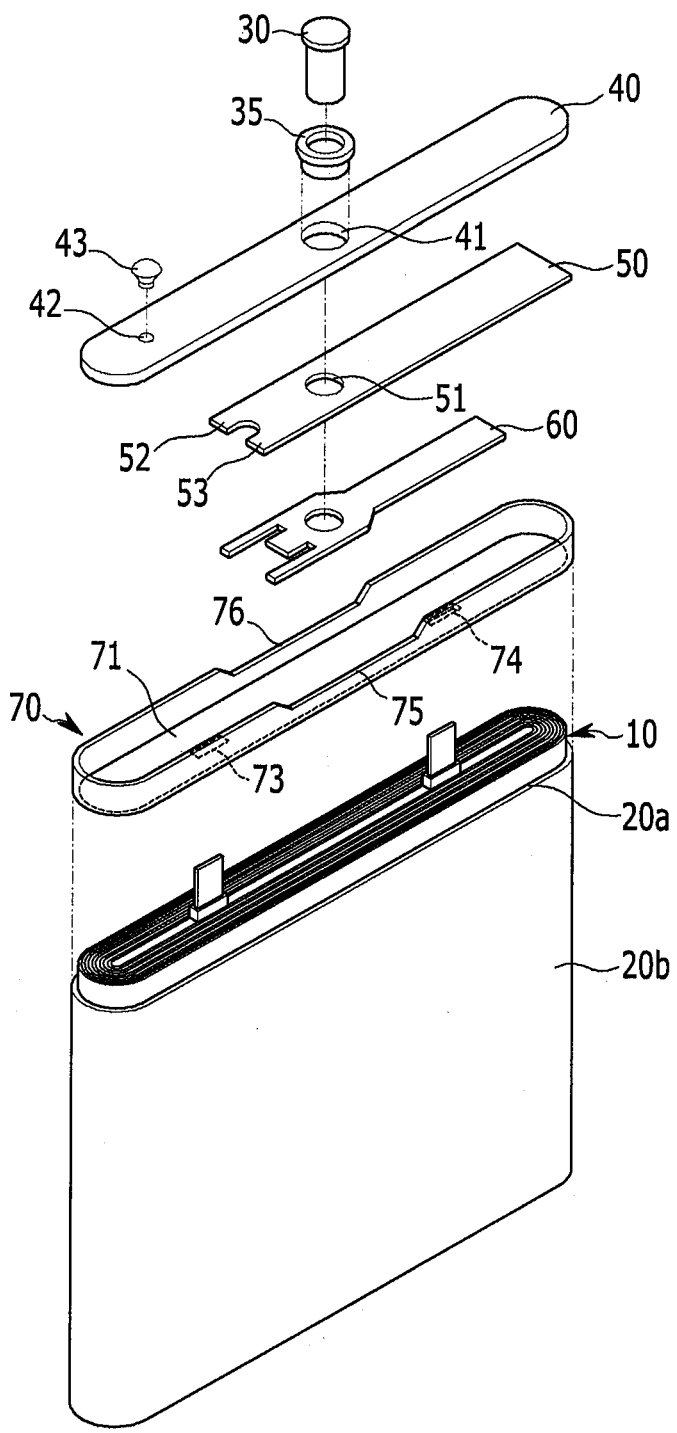
FIG. 1 is a partially exploded perspective view of a rechargeable battery according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings and description, like reference numerals designate like elements throughout the specification.

Figure 2:
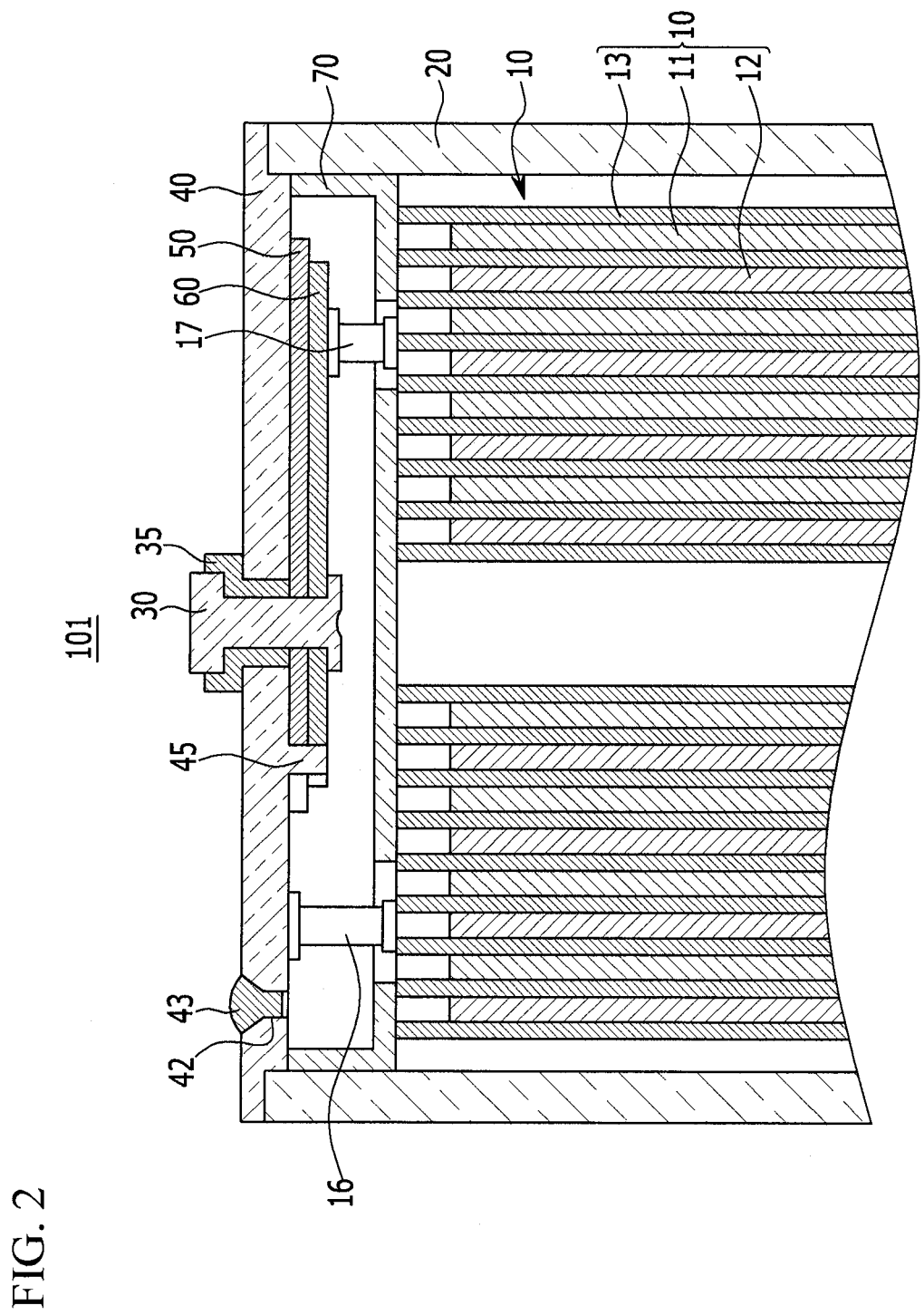
FIG. 2 is a cross-sectional view of a portion of the rechargeable battery according to the first exemplary embodiment of the present invention.
Figure 3:
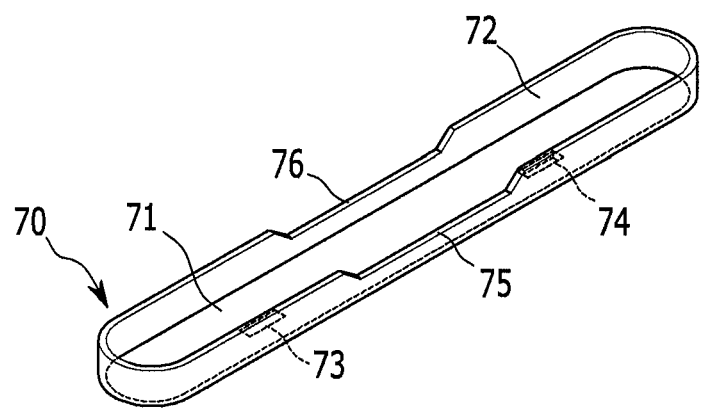
FIG. 3 is a perspective view of an insulation case according to the first exemplary embodiment of the present invention.
Figure 4:
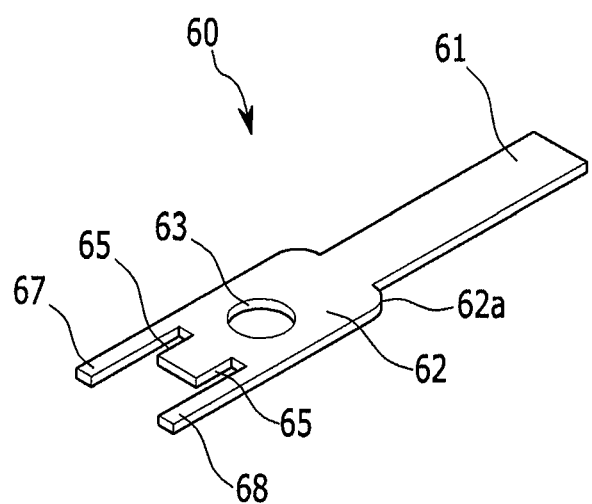
FIG. 4 is a perspective view of a connection plate according to the first exemplary embodiment of the present invention.

FIG. 1 is a partially exploded perspective view of a rechargeable battery according to a first exemplary embodiment of the present invention and FIG. 2 is a cross-sectional view of the rechargeable battery according to the first exemplary embodiment of the present invention.

Referring to FIG. 1 and FIG. 2, a rechargeable battery 101 according to the present exemplary embodiment includes an electrode assembly 10, a receiving case 20, and a cap plate 40. Hereinafter, the rechargeable battery is exemplarily described as a quadrangular shaped battery, but it is not limited thereto. Rather, embodiments of the present invention may be applied to various rechargeable batteries such as a pouch battery, a lithium polymer battery, and the like.

The electrode assembly 10 includes a positive electrode (first electrode) 11, a negative electrode (second electrode) 12, and a separator 13 provided between the positive electrode 11 and the negative electrode 12. The positive electrode 11 is formed in the shape of a long continuous band, and includes a positive electrode coated region where a positive electrode active material layer is formed and a positive electrode uncoated region where an active material is not coated. The positive electrode uncoated region is located at one end in a length direction of the positive electrode 11.

The negative electrode 12 is formed in the shape of a long continuous band, and includes a negative electrode coated region where a negative electrode active material layer is formed and a negative electrode uncoated region where an active material is not coated. The negative uncoated region is located at one end in a length direction of the negative electrode 12. The separator 13, which is an insulator is located between the positive electrode 11 and the negative electrode 12, and then, the positive electrode 11, the separator 13, and the negative electrode 12 are wound in a jelly-roll shape.

However, the present invention is not limited thereto, and the electrode assembly may have a structure in which the positive electrode, the separator, and the negative electrode are sequentially layered.

A positive electrode tab (first tab) 16 is fixed to the positive electrode 11, and a negative electrode tab (second tab) 17 is fixed to the negative electrode 12. The positive electrode tab 16 and the negative electrode tab 17 are oriented in parallel with a spiral turn shaft and protrude at cross-section portions where layers in the electrode assembly 10 are exposed. The positive electrode tab 16 and the negative electrode tab 17 protrude in a direction toward an opening in the receiving case 20, and they are separated from each other and thus are electrically insulated from each other.

The positive electrode tab 16 is made of an electrically conductive material such as nickel, aluminum, and the like, and is electrically connected to the cap plate 40. The negative electrode tab 17 is made of an electrically conductive material such as copper, nickel, and the like, and is electrically connected to the terminal 30.

The receiving case 20 receives the electrode assembly 10 through an opening 20a formed at an upper end thereof, and a horizontal cross-section of the receiving case 20 is formed in the shape of a rectangle having rounded corners. The receiving case 20 provides a space where an electrolyte solution is accommodated, and is electrically connected with the positive electrode tab 16. The receiving case 20 may be manufactured by processing aluminum or an aluminum alloy using a method such as metal deep drawing.

The cap plate 40 closes and seals the receiving case 20 by being coupled to the opening 20a of the receiving case 20, and is made of an electric conductive metal material such as aluminum or an aluminum alloy. The positive electrode tab 16 is welded to the bottom surface of the cap plate 40 such that the cap plate 40 is electrically charged by the positive electrode 11.

An insulation case 70 is provided between the electrode assembly 10 and the cap plate 40. The insulation case 70 includes a base 71 and a side wall 72 protruding from a side end of the base 71. The base 71 is formed in the shape of a plate, and a first tab opening 73 through which the positive electrode tab 16 is penetrated and a second tab opening 74 through which the negative electrode tab 17 is penetrated are formed in the base 71. The side wall 72 is continuous along the circumference of the base 71, and opened avoiding portions 75 and 76 are formed in the side wall 72. The avoiding portions 75 and 76 are formed in a structure that is concaved and/or recessed toward a lower portion from an upper end of the side wall 72, and the height of the side wall 72 is shorter in the avoiding portions 72 than in other portions. In one embodiment, the avoiding portions 75 and 76 are formed in the center in the length direction of the insulation case 70, and the two avoiding portions 75 and 76 are separated from each other along a width direction such that they face each other.

The terminal 30 is provided in the center of the cap plate 40, and penetrates the cap plate 40. The terminal 30 is provided in the cap plate 40, with an insulation gasket 35 located therebetween, and the insulation gasket 35 electrically insulates the terminal 30 and the cap plate 40 while surrounding the terminal 30.

An electrolyte solution injection opening 42 which is a path for injection of the electrolyte solution to the receiving case 20 is provided in the cap plate 40, and a stopper 43 is provided in the electrolyte solution injection opening 42 to close the electrolyte solution injection opening 42.

The terminal 30 penetrates the cap plate 40 and a connection plate 60, and the connection plate 60 is provided between the electrode assembly 10 and the cap plate 40 in the receiving case 20. In one embodiment, the connection plate 60 is formed in the shape of a pin, and provided in parallel with the cap plate 40.

The terminal 30 is fixed to the cap plate 40 and the connection plate 60 by riveting while penetrating the cap plate 40 and the connection plate 60. The negative electrode tab 17 is welded to the connection plate 60 and accordingly the terminal 30 can be electrically connected with the negative electrode through the connection plate 60 and the negative electrode tab 17.

An insulation plate 50 is provided between the cap plate 40 and the connection plate 60 to insulate the connection plate 60 from the cap plate 40. The insulation plate 50 is formed in the shape of an electrically insulating plate, and is provided in parallel with the cap plate 40.

A terminal opening 51 through which the terminal 30 penetrates is formed in the insulation plate 50, and two protrusions 52 and 53 are formed at one end in a length direction of the insulation plate 50. The protrusions 52 and 53 are separated from each other along a width direction of the insulation plate 50. An alignment protrusion 45 (FIG. 2) protruding downward toward the electrode assembly is formed in the cap plate 40, and the alignment protrusion 45 is provided between the protrusions 52 and 53. Accordingly, the insulation plate 50 can be located at an accurate location with ease.

The connection plate 60 is formed in the shape of a plate extended in one direction, and a terminal opening 63 through which the terminal 30 penetrates is formed in the connection plate 60. Accordingly, the connection plate 60 can rotate using the terminal 30 as a shaft.

The connection plate 60 is formed of a first portion 61 to which the negative electrode tab 17 is attached and a second portion through which the terminal 30 penetrates, and the second portion 62 has a wider width than the first portion 61. Thus, a short-circuit step 62a protruded to the outside from side end of the first portion 61 is formed in a portion where the first portion 61 and the second portion 62 are connected.

Two separated short-circuit protrusions 67 and 68 are formed at front ends of the second portion 62, and the short-circuit protrusions 67 and 78 protrude toward a length direction of the connection plate 60. The alignment protrusion 45 is provided between the short-circuit protrusions 67 and 68, and the short-circuit protrusions 67 and 68 are separated from each other to accommodate the alignment protrusion 45 therebetween. In addition, a cut-out portion 65 extended in a length direction of the short-circuit protrusions 67 and 68 is formed in a portion where the short-circuit protrusions 67 and 68 and the second portion 62 are connected. Accordingly, the length of the short-circuit protrusions 67 and 68 is increased and thus the short-circuit protrusions 67 and 68 can be easily bent.

In one embodiment, the avoiding portions 75 and 76 are provided between the side end of the connection plate 60 and the side surface of the receiving case 20, and more particularly, the avoiding portions 76 and 76 are provided between the second portion 62 and a side surface 20b of the receiving case 20. Accordingly, a side surface of the second portion 62 directly faces the receiving case 20. In addition, the avoiding portions 75 and 76 are provided between the short-circuit protrusions 67 and 68 and the side surface of the receiving case 20 and between the short-circuit step 62a and the side surface of the receiving case 20.

Figure 5A:
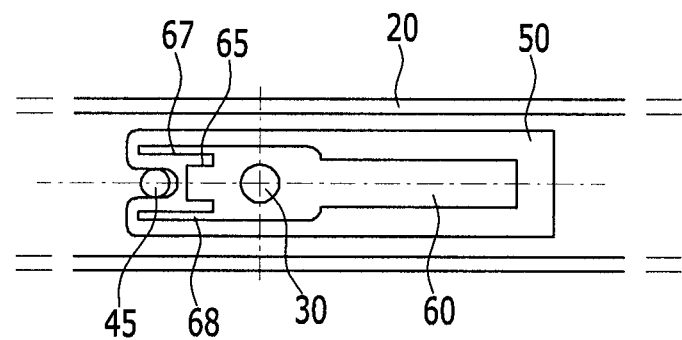
FIG. 5A are members coupled to a cap plate according to the first exemplary embodiment of the present invention viewed from the bottom.
Figure 5B:
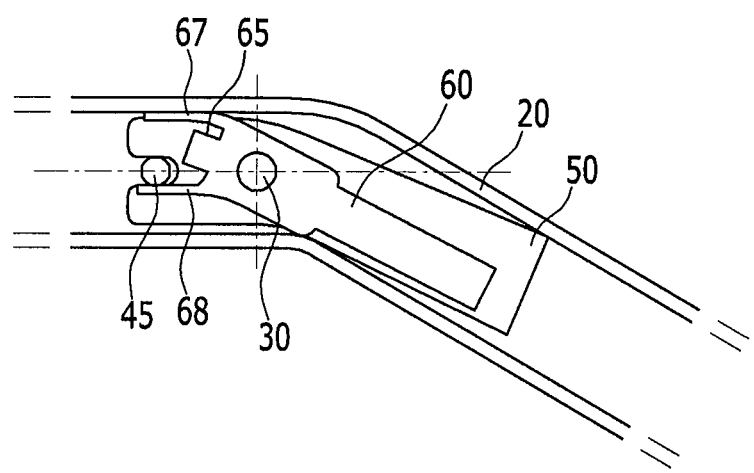
FIG. 5B shows a state that the cap plate of FIG. 5A is deformed due to longitudinal compressive force.
Figure 6A:
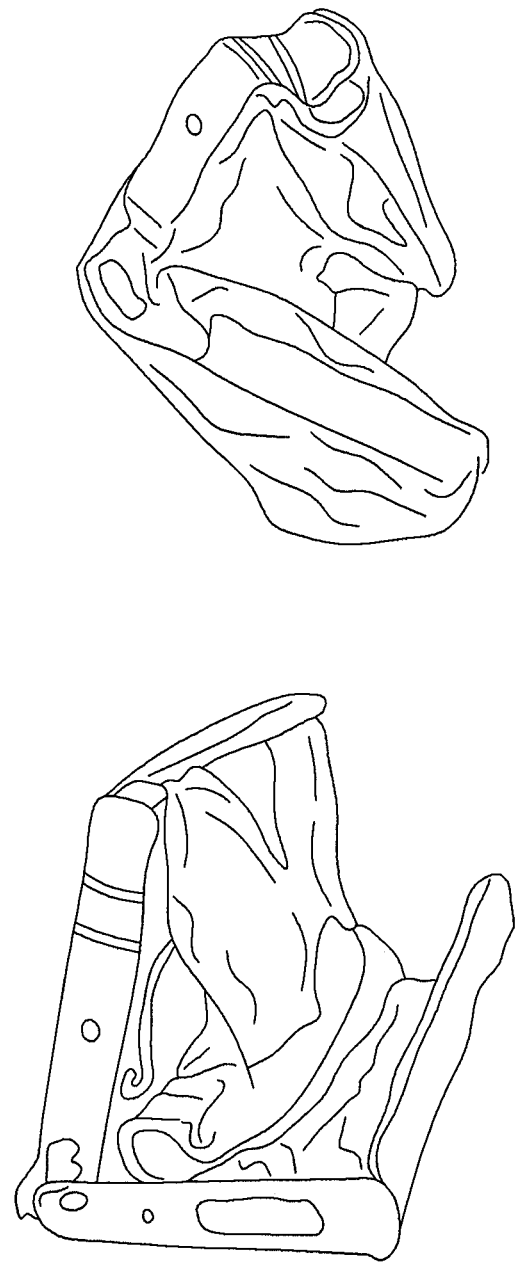
FIG. 6A shows the rechargeable battery deformed due to longitudinal compressive force according to the first exemplary embodiment of the present invention.
Figure 6B:
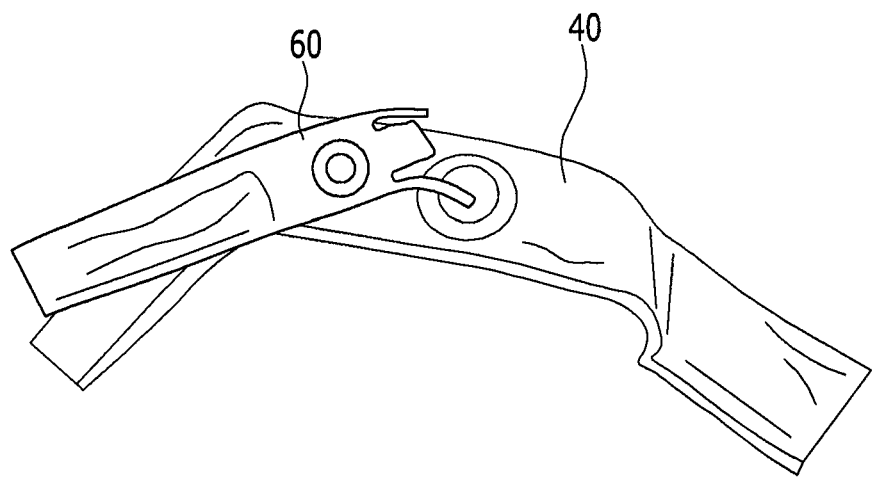
FIG. 6B is a photograph illustrating deformation of the cap plate of the rechargeable battery due to longitudinal compressive force according to the first exemplary embodiment of the present invention.

As shown in FIG. 5A and FIG. 5B, the receiving case 20 may be bent at a center portion thereof when a longitudinal compressive force is applied to the receiving case 20 due to the center portion of the receiving case 20 being relatively weak against a bending stress compared to other portions. In the specification, the longitudinal compressive force implies a compressive force that acts along a length direction of the cap plate 40.

The connection plate 60 is usually bent relatively less than a bending of the receiving case 20 because that the longitudinal compressive force is not directly applied to the connection plate 60 and the connection plate 60 is fixed to the cap plate 40 through the terminal 30 such that the connection plate 60 can rotate using the terminal 30 as a center axis.

Accordingly, the connection plate 60 and a side surface of the receiving case 20 may contact each other, specifically causing one short-circuit protrusion 67 to contact the side surface 20b of the receiving case 20 and the other short-circuit protrusion 68 to contact the alignment protrusion 45, thereby causing a short-circuit. In addition, the short-circuit step 20a may cause a short-circuit by contacting the receiving case 20. As described, the avoiding portions 75 and 76 are formed in the insulation case 70 in the present exemplary embodiment and thus the connection plate 60 directly contacts the side surface 20b of the receiving case 20, and therefore a short-circuit occurs in plural places in accordance with rotation of the connection plate 60.

When the rechargeable battery is deformed, a short-circuit may occur due to contact between deformed parts. When the short-circuit occurs, a current is instantaneously discharged, and therefore a larger amount of current compared to the current flowing in the normal state flows. In this case, excessive heat is generated in the short-circuited portion, and particularly, excessive heat may be generated in the rechargeable battery when the short-circuited member has high resistance.

However, since a short-circuit is artificially induced and the short-circuit occurs in multiple places when the rechargeable recharge is deformed in the present exemplary embodiment, the current may be dispersed through members having low contact resistance and then discharged. Accordingly, generation of excessive heat can be generated even through the short-circuit current flows.

Figure 7:
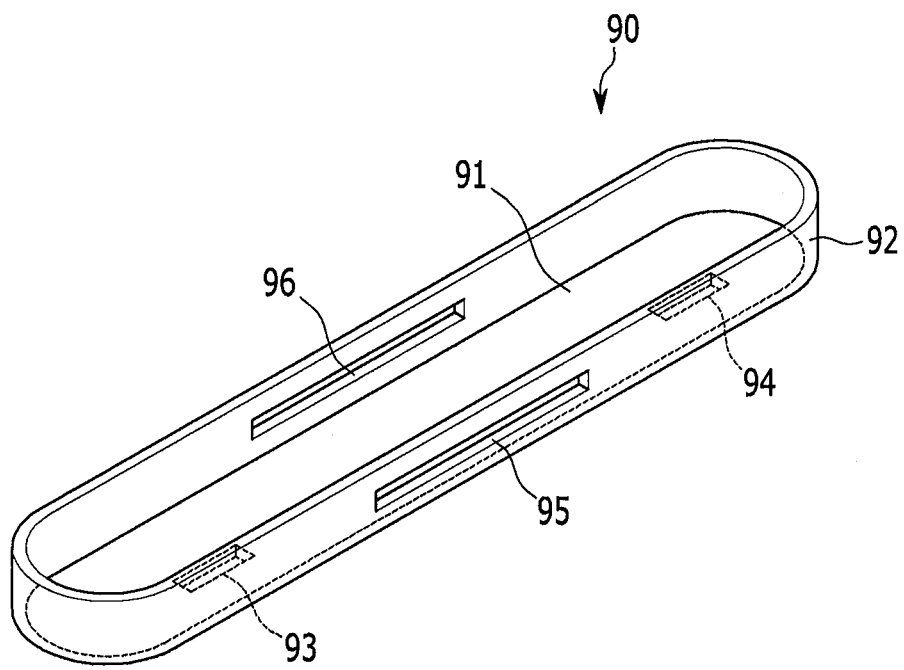
FIG. 7 is a perspective view of an insulation case according to a second exemplary embodiment of the present invention.

FIG. 7 is a perspective view of an insulation case according to a second exemplary embodiment of the present invention.

A rechargeable battery according to the present exemplary embodiment is the same as the rechargeable battery of the first exemplary embodiment except for a structure of an insulation case 90 and a connection plate 80, and therefore a description of the same structure will be omitted.

The insulation case 90 includes a base 91 and a side wall 92 protruding from a side end of the base 91. The base 91 is formed in the shape of a plate, and a first tab opening 93 through which a positive electrode tab 16 penetrates and a second tab opening 94 through which a negative electrode tab 17 penetrates are formed in the base 91. The side wall 92 is continuous along a circumference of the base 91, and opened avoiding portions 95 and 96 are formed in the side wall 92. The avoiding portions 95 and 96 are formed in the shape of openings penetrating the side wall 92, and extended in a length direction of the base 91. The avoiding portions 95 and 96 are formed in the center in the length direction of the insulation case 90, and are arranged separated from each other along a width direction of the insulation case 90 such that they face each other.

Figure 8:
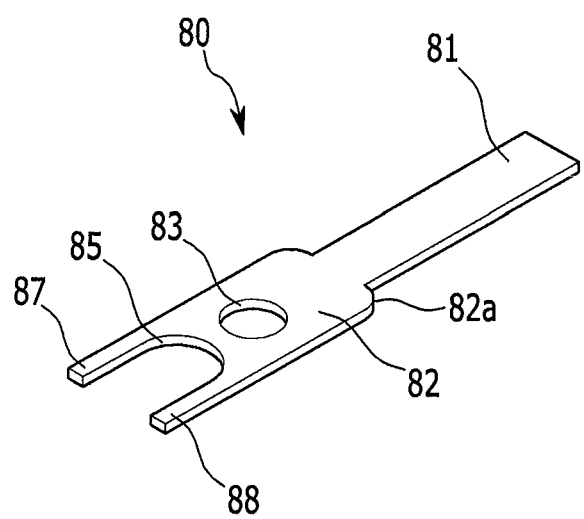
FIG. 8 is a perspective view of a connection plate according to the second exemplary embodiment of the present invention.
Figure 9:
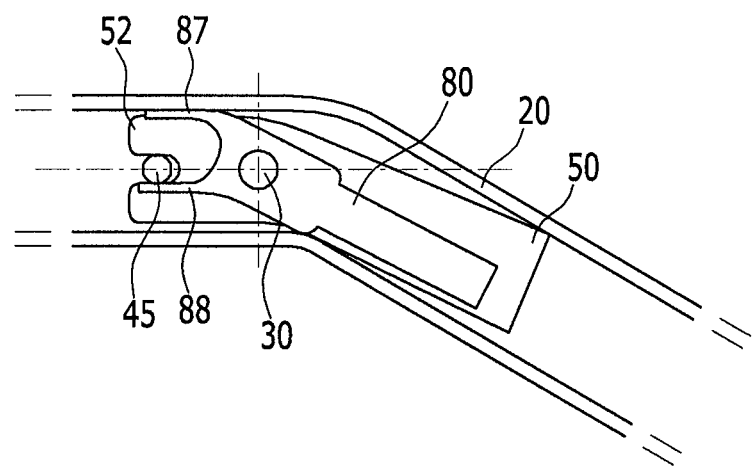
FIG. 9 shows a cap plate according to the second exemplary embodiment of the present invention being deformed due to longitudinal compressive force.

FIG. 8 is a perspective view of a connection plate according to the second exemplary embodiment of the present invention and FIG. 9 is a cap assembly according to the exemplary embodiment of the present invention viewed from the bottom.

Referring to FIG. 8 and FIG. 9, the connection plate 80 is formed in the shape of a plate extended in one direction, and a terminal opening 83 through which the terminal 30 penetrates is formed in the connection plate 80. Accordingly, the connection plate 80 can rotate using the terminal 30 as a rotation axis.

The connection plate 80 is formed of a first portion 81 to which the negative electrode tab 17 is attached and a second portion 82 through which the terminal 30 penetrates, and the second portion 82 has a wider width than the first portion 81. Thus, a short-circuit step 82a protruding to the outside from a side end of the first portion 81 is formed in a portion where the first portion 81 and the second portion 82 are connected.

Two short-circuit protrusions 87 and 88 are formed at a front end of the second portion 82 and an alignment protrusion 45 is located between the two short-circuit protrusions 87 and 88. In addition, a concave groove 85 is formed between the short-circuit protrusions 87 and 88 and the two short-circuit protrusions 87 and 88 are separated from each other with the concave groove 85 located therebetween. The groove 85 is formed concave toward an inner side from the front end of the second portion 82.

In one embodiment, the avoiding portions 95 and 96 are formed between the first portion 81 and a side surface 20b of the receiving case 20, and accordingly, a side surface of the first portion 81 directly contacts the receiving case 20. In particular, the avoiding portions 95 and 96 may be formed between the short-circuit protrusions 87 and 88 and the receiving case 20 and between the short-circuit step 82a and the receiving case 20.

As shown in FIG. 9, when a longitudinal compression force is applied to the receiving case 20, one short-circuit protrusion 87 contacts the side surface 20b of the case 20 and the other short-circuit protrusion 88 contacts the alignment protrusion 45, thereby causing a short-circuit. In addition, the short-circuit step 82a may cause a short-circuit by contacting the receiving case 20.

Figure 10:
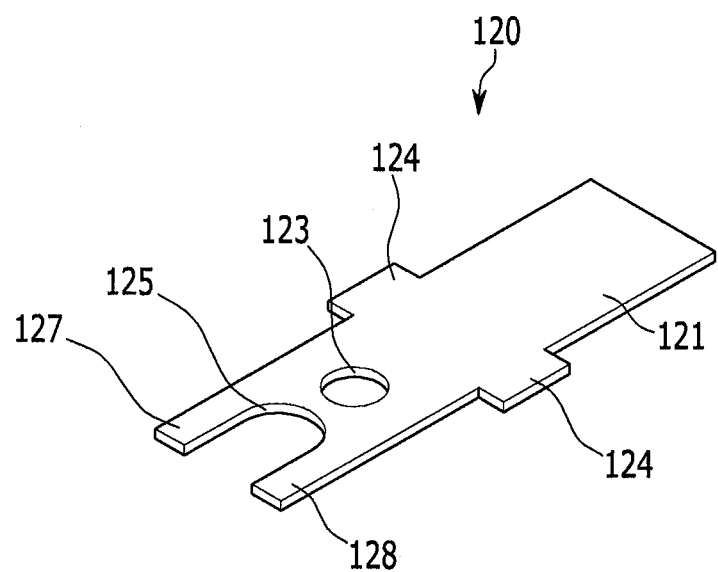
FIG. 10 is a perspective view of a connection plate according to a third exemplary embodiment of the present invention.
Figure 11:
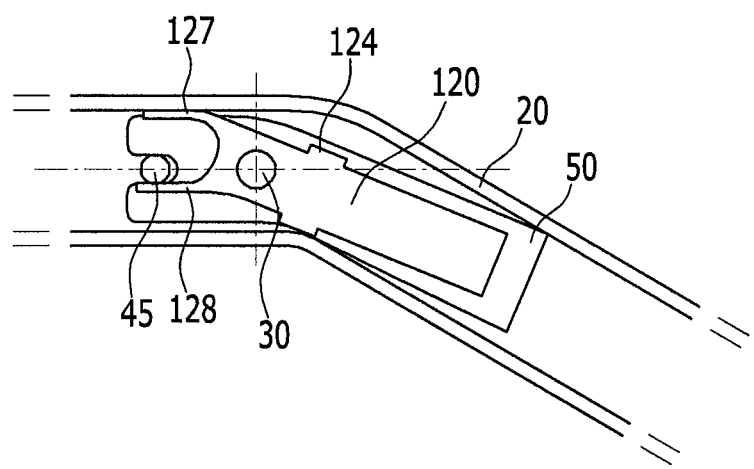
FIG. 11 shows a cap plate according to the third exemplary embodiment of the present invention being deformed due to longitudinal compressive force.

FIG. 10 is a perspective view of a connection plate according to a third exemplary embodiment of the present invention and FIG. 11 is a cap assembly according to the third exemplary embodiment of the present invention, viewed from the bottom.

Referring to FIG. 10 and FIG. 11, a rechargeable battery according to the present exemplary embodiment is the same as the rechargeable battery of the first exemplary embodiment except for a structure of a connection plate 120, and therefore a description of the same structure will be omitted.

The connection plate 120 is formed in the shape of a plate extended in one direction, and a terminal opening 123 through which a terminal 30 penetrates is formed in the connection plate 120. Accordingly, the connection plate 120 can rotate using the terminal 30 as a rotation axis.

A short-circuit step 124 protruding to the outside is formed at a side end of the connection plate 120. The short-circuit step 124 protrudes to a width direction of the connection plate 120 from lateral side ends of the connection plate 120.

Two short-circuit protrusions 127 and 128 are formed at one front end of the connection plate 120 and an alignment protrusion 45 is provided between the short-circuit protrusions 127 and 128. In addition, a concave groove 125 is formed between the short-circuit protrusions 127 and 128 and the two short-circuit protrusions 127 and 128 are separated from each other, accommodating the groove 45 therebetween. The groove 125 is extended toward an inner side from a front end of the connection plate 120.

As shown in FIG. 11, when a longitudinal compression force is applied to the receiving case 20, one short-circuit protrusion 127 contacts a side surface of the receiving case 20 and the other short-circuit protrusion 128 contacts the alignment protrusion 45, thereby causing a short-circuit. In addition, the short-circuit step 124 may cause a short-circuit by contacting the receiving case 20.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Description of symbols

| | |
|---|---|
| 101: rechargeable battery | 10: electrode assembly |
| 11: positive electrode | 12: negative electrode |
| 13: separator | 16: positive electrode tab |
| 17: negative electrode tab | 20: receiving case |
| 20a: opening | 20a: short-circuit step |
| 20b: side surface | 30: terminal |
| 35: insulation gasket | 40: cap plate |
| 42: electrolyte solution injection opening | 43: stopper |
| 45: alignment protrusion | 50: insulation plate |
| 51, 63, 73, 123: terminal opening | 52, 53: protrusion |
| 60, 80, 120: connection plate | 61, 81: first portion |
| 62, 82: second portion | 62a, 82a, 124: short-circuit step |
| 65: cut-out portion | |
| 67, 68. 87, 88, 127, 128: short-circuit protrusion | |
| 85, 125: groove | 70, 90: insulation case |
| 71, 91: base | 72, 92: side wall |
| 73, 93: first tab opening | 74, 94: second tab opening |
| 75, 76, 95, 96: avoiding portion | |

What is claimed is:

1. A rechargeable battery comprising:
   an electrode assembly including a first electrode, a second electrode, and a separator located between the first electrode and the second electrode;
   a case accommodating the electrode assembly;
   a cap plate sealing an opening of the case, the cap plate having an alignment protrusion protruding towards the electrode assembly;
   an insulation case located between the cap plate and the electrode assembly, the insulation case having a base and a side wall protruding from the base, the side wall including recessed avoiding portions formed thereon, a first tab on the first electrode, the first electrode electrically connected with the cap plate via the first tab;

a second tab on the second electrode; and a connection plate electrically connected to the second tab and being rotatable with respect to the cap plate, wherein the connection plate has a pair of short circuit protrusions spaced from each other such that a first protrusion of the pair of short circuit protrusions is configured to contact the case and a second protrusion of the pair of short circuit protrusions is configured to contact the alignment protrusion if the case is bent.

2. The rechargeable battery of claim 1, wherein the avoiding portions are recessed toward a lower portion from an upper end of the side wall, wherein a height of the avoiding portions is less than a height of the insulation case, and wherein at least part of the connection plate faces with the avoiding portions.

3. The rechargeable battery of claim 1, wherein the avoiding portions are openings that penetrate the side wall.

4. The rechargeable battery of claim 1, wherein the avoiding portions are provided between a side end of the connection plate and a side surface of the case, and wherein the side end of the connection plate faces with the side surface of the case.

5. The rechargeable battery of claim 1, wherein the connection plate is fixed to the cap plate by a terminal that penetrates the cap plate and the connection plate.

6. The rechargeable battery of claim 5, further comprising an insulation plate located between the cap plate and the connection plate.

7. The rechargeable battery of claim 6, wherein the connection plate comprises a short-circuit step extending from lateral side ends and protruding in a width direction of the connection plate.

8. The rechargeable battery of claim 7, wherein the avoiding portions are located between the short-circuit step and the side surfaces of the case.

9. The rechargeable battery of claim 5, wherein the connection plate comprises a first portion to which the first tab is attached and a second portion through which the terminal penetrates, wherein the second portion has a greater width than the first portion.

10. The rechargeable battery of claim 9, wherein a short-circuit step protruding to the outside from a side end of the first portion is formed at an intersection of the first portion and the second portion.

11. The rechargeable battery of claim 9, wherein the avoiding portions are located between the second portion and the side surface of the case.

12. The rechargeable battery of claim 11, wherein two avoiding portions separated from each other face each other along a width direction of the insulation case.

13. The rechargeable battery of claim 9, wherein the short-circuit protrusions extend from an end of the second portion.

14. The rechargeable battery of claim 13, wherein the alignment protrusion is located between the short-circuit protrusions.

15. The rechargeable battery of claim 14, wherein a cut-out portion extending in a length direction of the short-circuit protrusion is formed in a portion where the short-circuit protrusions and the second portion are connected.

16. The rechargeable battery of claim 14, wherein a groove is located between the short-circuit protrusions, and wherein the groove is recessed toward an inner side from the second portion.

* * * * *